(12) United States Patent
Peuhkurinen et al.

(10) Patent No.: US 11,275,945 B2
(45) Date of Patent: Mar. 15, 2022

(54) IMAGING SYSTEM AND METHOD FOR PRODUCING IMAGES WITH VIRTUALLY-SUPERIMPOSED FUNCTIONAL ELEMENTS

(71) Applicant: Varjo Technologies Oy, Helsinki (FI)

(72) Inventors: Ari Antti Peuhkurinen, Helsinki (FI); Aleksei Romanov, Vantaa (FI); Evgeny Zuev, Helsinki (FI); Yuri Popov, Helsinki (FI); Tomi Lehto, Helsinki (FI); Urho Konttori, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 0 days.

(21) Appl. No.: 16/831,152

(22) Filed: Mar. 26, 2020

(65) Prior Publication Data
US 2021/0303854 A1 Sep. 30, 2021

(51) Int. Cl.
| | | |
|---|---|---|
| G06K 9/00 | (2006.01) |
| G06T 7/73 | (2017.01) |
| G06F 3/01 | (2006.01) |
| G06T 15/20 | (2011.01) |
| G06T 19/00 | (2011.01) |

(52) U.S. Cl.
CPC ......... *G06K 9/00671* (2013.01); *G06F 3/013* (2013.01); *G06F 3/017* (2013.01); *G06T 7/74* (2017.01); *G06T 15/205* (2013.01); *G06T 19/006* (2013.01); *G06T 2215/16* (2013.01)

(58) Field of Classification Search
CPC .......................... G06T 19/006; G06K 9/00671
See application file for complete search history.

(56) References Cited

U.S. PATENT DOCUMENTS

| | | | |
|---|---|---|---|
| 9,256,795 B1* | 2/2016 | Gray | G06K 9/6857 |
| 10,237,509 B1* | 3/2019 | Kim | G06F 3/0233 |
| 10,395,427 B1* | 8/2019 | Cote | G06T 7/75 |
| 2011/0242103 A1* | 10/2011 | Han | H04N 13/31 |
| | | | 345/419 |
| 2011/0319130 A1* | 12/2011 | Lee | G06T 19/006 |
| | | | 455/556.1 |
| 2012/0102438 A1* | 4/2012 | Robinson | G06F 3/011 |
| | | | 715/863 |

(Continued)

FOREIGN PATENT DOCUMENTS

EP  1752861 A1 *  2/2007  ............... G06F 3/00

*Primary Examiner* — Ryan R Yang
(74) *Attorney, Agent, or Firm* — Ziegler IP Law Group, LLC (57) ABSTRACT

An imaging system and a method for producing extended-reality images for a display apparatus. The imaging system includes camera and processor. The processor is configured to: control camera to capture image of real-world environment; analyse captured image to identify first image segment representing input device and to determine location of at least one actionable area of input device in first image segment; determine at least one functional element to be presented for the actionable area, the functional element being indicative of at least one of: functionality of the at least one actionable area, status of the at least one actionable area; and process captured image to generate extended-reality image in which the functional element is virtually superimposed over the actionable area of input device or a virtual representation of the actionable area of input device.

18 Claims, 3 Drawing Sheets

(56) References Cited

U.S. PATENT DOCUMENTS

| | | | |
|---|---|---|---|
| 2012/0209745 A1* | 8/2012 | Spencer, II | G07F 7/0886 |
| | | | 705/26.41 |
| 2014/0049558 A1* | 2/2014 | Krauss | G02B 27/017 |
| | | | 345/633 |
| 2015/0227222 A1* | 8/2015 | Sako | G06F 3/017 |
| | | | 345/173 |
| 2017/0262045 A1* | 9/2017 | Rouvinez | G06F 3/011 |
| 2017/0371405 A1* | 12/2017 | Kwon | G06T 15/40 |
| 2018/0074599 A1* | 3/2018 | Garcia | G02B 27/0176 |
| 2019/0050062 A1* | 2/2019 | Chen | G06T 7/70 |
| 2019/0260748 A1* | 8/2019 | Leleu | H04L 63/0428 |
| 2021/0096638 A1* | 4/2021 | O'Hern | G06F 3/03545 |

* cited by examiner

IMAGING SYSTEM AND METHOD FOR PRODUCING IMAGES WITH VIRTUALLY-SUPERIMPOSED FUNCTIONAL ELEMENTS

TECHNICAL FIELD

The present disclosure relates generally to extended-reality technology; and more specifically, to imaging systems for producing extended-reality images for display apparatuses with virtually-superimposed functional elements. The present disclosure also relates to methods for producing extended-reality images for display apparatuses with virtually-superimposed functional elements. Moreover, the present disclosure relates to a display apparatus for rendering extended-reality images with virtually-superimposed functional elements.

BACKGROUND

Immersive technologies such as augmented-reality, virtual-reality, mixed-reality (sometimes, collectively referred to as extended-reality technology) are being employed in various fields such as entertainment, real estate, training, medical imaging operations, simulators, navigation, and the like. Such immersive technologies blend a virtual-world environment with a real-world environment to create an immersive extended-reality environment. A conventional display apparatus employs an imaging system for capturing image(s) of the real-world environment wherein users using a head-mounted display (HMD) device, are transported to experience the extended-reality environment. Particularly, the imaging system of the display apparatus produces a digital recreation of a real-world environment or delivers virtual elements as an overlay to the real-world environment.

Typically, users interact with the extended-reality environment by means of input devices such as keyboards, joysticks, remote controllers, computer mice, simulated reality consoles, and the like. Generally, a given input device provides a limited range of interaction functionality to a user, and typically no information for an application specific functionality. For example, a remote controller allows the user to interact with the extended-reality environment by way of pressing buttons only, without any prior information about functions served by the pressed buttons. Therefore, whilst using the input devices, the user faces difficulties in order to interact with the extended-reality environment produced by the conventional display apparatus. In an example, there can be instances wherein a user using the HMD device with a given extended-reality environment has poor visibility of the input device through the HMD device and/or where the user faces difficulty in perceiving buttons or other input areas of the input device through the HMD device.

Therefore, in light of the foregoing discussion, there exists a need to overcome the aforementioned drawbacks associated with conventional imaging system for producing extended-reality images to interacting with and experiencing extended-reality environment.

SUMMARY

The present disclosure seeks to provide an imaging system for producing extended-reality images for a display apparatus. The present disclosure also seeks to provide a method for producing extended-reality images for a display apparatus. The present disclosure further seeks to provide a display apparatus for rendering the generated extended-reality images. The present disclosure seeks to provide a solution to the existing problem of limitations of input devices associated with such display apparatus for providing inputs for interacting with and experiencing extended-reality environment. An aim of the present disclosure is to provide a solution that overcomes at least partially the problems encountered in prior art, and provides a display apparatus for rendering extended-reality images with virtually-superimposed functional elements.

In one aspect, an embodiment of the present disclosure provides an imaging system for producing extended-reality images for a display apparatus, the imaging system comprising at least one camera and a processor communicably coupled to the at least one camera, wherein the processor is configured to:

control the at least one camera to capture an image of a real-world environment;

analyse the captured image to identify a first image segment representing an input device present in the real-world environment and to determine a location of at least one actionable area of the input device in the first image segment;

determine at least one functional element to be presented for the at least one actionable area, the at least one functional element being indicative of at least one of: a functionality of the at least one actionable area, a status of the at least one actionable area; and process the captured image to generate an extended-reality image in which the at least one functional element is virtually superimposed over the at least one actionable area of the input device located in the first image segment or a virtual representation of the at least one actionable area of the input device.

In another aspect, an embodiment of the present disclosure provides a method for producing extended-reality images for a display apparatus, the method comprising:

capturing an image of a real-world environment;

analysing the captured image to identify a first image segment representing an input device present in the real-world environment and to determine a location of at least one actionable area of the input device in the first image segment;

determining at least one functional element to be presented for the at least one actionable area, the at least one functional element being indicative of at least one of: a functionality of the at least one actionable area, a status of the at least one actionable area; and processing the captured image to generate an extended-reality image in which the at least one functional element is virtually superimposed over the at least one actionable area of the input device located in the first image segment or a virtual representation of the at least one actionable area of the input device.

In yet another aspect, an embodiment of the present disclosure provides a display apparatus comprising at least one image renderer, at least one camera and a processor configured to:

control the at least one camera to capture an image of a real-world environment;

analyse the captured image to identify a first image segment representing an input device present in the real-world environment and to determine a location of at least one actionable area of the input device in the first image segment;

determine at least one functional element to be presented for the at least one actionable area, the at least one functional element being indicative of at least one of: a functionality of the at least one actionable area, a status of the at least one actionable area;

process the captured image to generate an extended-reality image in which the at least one functional element is virtually superimposed over the at least one actionable area of the input device located in the first image segment or a virtual representation of the at least one actionable area of the input device; and render, via the at least one image renderer, the generated extended-reality image.

Embodiments of the present disclosure substantially eliminate or at least partially address the aforementioned problems in the prior art, and enables rendering of extended-reality images for a user with virtual enhancements for input devices for a more interactive and comprehensible experience at user's end.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides an imaging system for producing extended-reality images for a display apparatus, the imaging system comprising at least one camera and a processor communicably coupled to the at least one camera, wherein the processor is configured to:

control the at least one camera to capture an image of a real-world environment;

analyse the captured image to identify a first image segment representing an input device present in the real-world environment and to determine a location of at least one actionable area of the input device in the first image segment;

determine at least one functional element to be presented for the at least one actionable area, the at least one functional element being indicative of at least one of: a functionality of the at least one actionable area, a status of the at least one actionable area; and process the captured image to generate an extended-reality image in which the at least one functional element is virtually superimposed over the at least one actionable area of the input device located in the first image segment or a virtual representation of the at least one actionable area of the input device.

In another aspect, an embodiment of the present disclosure provides a method for producing extended-reality images for a display apparatus, the method comprising:

capturing an image of a real-world environment;

analysing the captured image to identify a first image segment representing an input device present in the real-world environment and to determine a location of at least one actionable area of the input device in the first image segment;

determining at least one functional element to be presented for the at least one actionable area, the at least one functional element being indicative of at least one of: a functionality of the at least one actionable area, a status of the at least one actionable area; and processing the captured image to generate an extended-reality image in which the at least one functional element is virtually superimposed over the at least one actionable area of the input device located in the first image segment or a virtual representation of the at least one actionable area of the input device.

In yet another aspect, an embodiment of the present disclosure provides a display apparatus comprising at least one image renderer, at least one camera and a processor configured to:

control the at least one camera to capture an image of a real-world environment;

analyse the captured image to identify a first image segment representing an input device present in the real-world environment and to determine a location of at least one actionable area of the input device in the first image segment;

determine at least one functional element to be presented for the at least one actionable area, the at least one functional element being indicative of at least one of: a functionality of the at least one actionable area, a status of the at least one actionable area;

process the captured image to generate an extended-reality image in which the at least one functional element is virtually superimposed over the at least one actionable area of the input device located in the first image segment or a virtual representation of the at least one actionable area of the input device; and render, via the at least one image renderer, the generated extended-reality image.

The present disclosure provides the aforementioned imaging system and method for producing extended-reality images for a display apparatus. The imaging system disclosed herein, enables the user to clearly perceive the actionable areas of the input device through the display apparatus. The imaging system provides the user of the display apparatus, cues corresponding to the actionable areas of the input device when the user interact with the extended-reality environment via the input device. With this, the user of the display apparatus is able to use the input device more efficiently, specifically pertaining to the functionality of the actionable areas of the input device intended for a given extended-reality environment. Therefore, the imaging system allows for a comprehensible and seamless interaction between the user and the input device in real time or near real time. Furthermore, the imaging system disclosed herein is simple, user-friendly, and robust.

Throughout the present disclosure, the term "display apparatus" (also sometimes referred to as "display device) pertains to a specialized equipment that is configured to present a simulated environment to the user, when in operation it is worn by the user on his/her head. In such an instance, the display apparatus acts as a head mounted device (for example, such as a virtual reality headset, a pair of virtual reality glasses, an augmented reality headset, a pair of augmented reality glasses, a mixed reality headset, a pair of mixed reality glasses, and the like) that is operable to present a visual scene of the simulated environment to the user. Further, the term "imaging system" refers to a specialized equipment for producing extended-reality images for rendering by the display apparatus. Herein, the term "extended-reality" encompasses both augmented reality and mixed reality. The extended-reality images produced by the imaging system are employed to present the extended-reality environment to a user of the display apparatus, when the display apparatus, in operation, is worn by the user. It will be appreciated that, in some implementations the imaging system may be coupled to the display apparatus, while in some other implementations the imaging system may not be coupled to the display apparatus and operates as a separate unit.

The imaging system comprises at least one camera. Throughout the present disclosure, the term "at least one camera" refers to equipment that is operable to detect and capture images of an object or a real-world environment. The camera can be employed to capture images of any physical scene or structure of an object of a real-world environment. The images captured by the camera, depending upon a field of application, may be further subjected to processing, compression, storage, printing, display or any combination of these.

The imaging system further comprises a processor. Throughout the present disclosure, the term "processor" refers to an integrated electronic circuit that performs operations on some input data stream to produce an appropriate output. The processor could be implemented as hardware, software, firmware or a combination of these. The processor is coupled to various components of the imaging system and configured to control the operation of the imaging system. In the imaging system, the processor is communicably coupled to the at least one camera.

The processor is configured to control the at least one camera to capture the image of the real-world environment. For this purpose, the processor may send a control signal to the camera to activate and capture the image of the real-world environment in field of view thereof. Herein, the real-world environment can be an indoor environment or an outdoor environment where the user of the display apparatus is present and the display apparatus, in operation, is worn by the user. Notably, the captured image represents objects (for example, people, furniture, devices and the like) in the real-world environment.

The processor is also configured to analyse the captured image to identify the first image segment representing the input device present in the real-world environment and to determine a location of at least one actionable area of the input device in the first image segment. Herein, the term "image segment" refers to a part of a captured image, when the captured image is divided into multiple segments (set of pixels). Further, throughout the present disclosure, the term "input device" refers to a piece of hardware equipment intended to provide data and control signals to an information processing system such as the imaging system. Examples of input device may include, but are not limited to, a keyboard, a microphone, a mouse, a joystick, a remote controller and the like. The input device is controlled by the user to provide data and control signals to the information processing system such as the imaging system. Notably, in augmented reality, a real input device is shown to the user of the display apparatus, when the display apparatus, in operation, is worn by the user. Whilst, in mixed reality, the input device is virtualized and shown as a virtual input device, wherein the pose (position and orientation) of the virtual input device is closely matched with the pose of the real input device in the real-world environment (where the user of the display apparatus is present). And, the term "actionable area" refers to an area on the input device wherein the input is provided by the user of the input device. Notably, the user can engage with the at least one actionable area via at least one of: touch input, voice input, motion input, gesture input. The at least one actionable area may include, for example, keys of a keyboard, a click button of a mouse, a shaft of a joystick, and the like.

Optionally, the processor uses at least one image processing algorithm to analyse the captured image. The at least one image processing algorithm is at least one of: an image segmentation algorithm, an image detection algorithm, an image recognition algorithm, an edge detection algorithm, a pattern recognition algorithm, a texture recognition algorithm, an edge extraction algorithm, a symmetry recognition algorithm. The at least one image processing algorithm collectively contributes to extract semantic information from the captured image to identify the image segment which corresponds to the input device and the location of the at least one actionable area of the input device.

Optionally, when analysing the captured image, the processor is configured to:

access a data repository having stored therein reference images of different types of input devices and different variations of a given type of input device along with information pertaining to a plurality of reference features extracted from a given reference image;

extract a plurality of features from the captured image;

compare the plurality of features extracted from the captured image with the plurality of reference features extracted from the given reference image to identify a type and variation of the input device present in the real-world environment;

access, from the data repository, information about the type and variation of the input device; and determine the location of the at least one actionable area of the input device based on the information about the type and variation of the input device.

Herein, the term "data repository" refers to a large central database that store and manage data. For instance, the data repository is a memory device wherein the data is stored and retrieved. Examples of memory device includes but not limited to, a hard drive disk, a compact disc, a universal serial bus flash drive, a secure digital card, a solid-state drive, a cloud storage. Wherein the data is stored and retrieved.

Throughout the present disclosure, the term "reference images" refer to images of different types of input devices and different variations of a given type of input device. The reference images reside in the data repository and employed as a source of information in order to ascertain the input device present in the real-world environment. As discussed, the types of input device can be keyboard, microphone, mouse, joystick, remote controller, VR controller and the like. Herein, the variation of the input device refers to additional features or attributes distinguishing same type of input devices. These additional features of the input device can be models of the input device, form factors of the input device, specific number of keys or buttons in the input device, size of keys or buttons in the input device, relative positions of keys or buttons in the input device and the like. In an example, a keyboard is the type of the input device and the variation of the keyboard is a numeric keyboard, an alphabetical keyboard, an alphanumeric keyboard, a hand-held ergonomic keyboard, and the like. The information pertaining to a plurality of reference features extracted from a given reference image are compared to the plurality of features extracted from the captured image, to determine variation of the input device. In one example, the variation of the input device (for example, the model of the keyboard) can be determined based on comparison of characters (printed on keys of the keyboard). Such comparison would involve optical character recognition in addition to feature extraction.

Optionally, the at least one processor is configured to employ at least one image-processing algorithm to extract features from a given image from amongst the plurality of images. Examples of the features include, but are not limited to, edges, corners, blobs and ridges. It will be appreciated that feature extraction is well-known in the art. Examples of the at least one image-processing algorithm include, but are not limited to: an edge-detection algorithm (for example, such as Canny edge detector, Deriche edge detector and the like); a corner-detection algorithm (for example, such as Harris & Stephens corner detector, Shi-Tomasi corner detector, Features from Accelerated Segment Test (FAST) corner detector and the like); a blob-detection algorithm (for example, such as Laplacian of Gaussian (LoG)-based blob detector, Difference of Gaussians (DoG)-based blob detector, Maximally Stable Extremal Regions (MSER) blob detector and the like); a feature descriptor algorithm (for example, such as Binary Robust Independent Elementary Features (BRIEF), Gradient Location and Orientation Histogram (GLOH), Histogram of Oriented Gradients (HOG) and the like); and a feature detector algorithm (for example, such as Scale-Invariant Feature Transform (SIFT), Oriented FAST and rotated BRIEF (ORB), Speeded Up Robust Features (SURF) and the like).

For accessing the data repository, it may be appreciated that the imaging system, or the display apparatus itself, is connected in communication with the data repository to access the stored reference images therein. Herein, optionally the processor is coupled to the data repository in either wirelessly or in a wired manner. In one or more examples, the display apparatus may be in communication with the data repository using Internet. The display apparatus may include a communication device, such as a modem, a Wi-Fi chip or the like to connect to the Internet and therefrom the data repository, for accessing the stored reference images therein.

During comparison, the input device in the captured image of the real-world environment is compared with the reference images. In an example, at a broader level, to identify the type of input device, the captured image of the input device is juxtaposed with stored-in reference images, and a similarity threshold is determined indicative of similarity of the input device in the captured image with the input device in each of the reference images. It may be appreciated that the above explained process may be performed by using a suitable image processing algorithm (as provided earlier). The reference image with the highest determined similarity threshold or meeting a predefined similarity threshold is considered as representative of the input device in the captured image. In particular, the comparison involves comparing the plurality of features extracted from the captured image with the plurality of reference features extracted from the given reference image.

Further, the processor is configured to access, from the data repository, information about the type and variation of the input device. That is, the information regarding the type and variation of the input device is accessed from the data repository by the processor. The corresponding information about the type and variation of the input device in the considered reference image with the highest determined similarity threshold or meeting a predefined similarity threshold is extracted from the data repository.

Further, the processor is configured to determine the location of the at least one actionable area of the input device based on the information about the type and variation of the input device. In one example, the information about the location of the at least one actionable area of the input device is stored along with the information about the type and variation of the input device, as extracted from the data repository. So when corresponding information about the type and variation of the input device in the considered reference image with the highest determined similarity threshold or meeting a predefined similarity threshold is extracted from the data repository, along with that the location of the at least one actionable area of the input device is also extracted.

Optionally, when analysing the captured image, the processor is configured to:

obtain, from a computing device associated with the input device, information identifying a type and variation of the input device;

access, from a data repository, information about the type and variation of the input device; and determine the location of the at least one actionable area in the input device based on the information about the type and variation of the input device.

Throughout the present disclosure, the term "computing device" refers to an external electronic device controlled by a central processing unit and capable of being connected with other peripheral devices such as input devices and output devices. In an example, the computing device can be a personal computer to which the input device is connected via an input-output (I/O) interface. In order to access and obtain information from the computing device, the display apparatus implements a communication unit. Herein, the term "communication unit" refers to an electronic device that helps establish communication between the computing device and the display apparatus. In the present examples, the communication unit may be a Bluetooth controller, a Wi-Fi controller, a wired connection controller and the like. The communication unit enables transmission of information about the type and variation of the input device from the computing device to the display apparatus.

In this regard, when analysing the captured image, the processor is configured to obtain, from the computing device associated with the input device, information identifying a type and variation of the input device. It may be appreciated that when peripheral devices such as input device is plugged into the computing device, the input device is detected by a change in voltage on the lines that connect it to the computing device. The circuitry (motherboard chipset in the computing device) responsible for the peripheral devices, detects this change of voltage and initiates a basic handshake with the input device. This handshake establishes basic information about the input device such as model, manufacturer, type, location or status of the input device. In this way, the computing device identifies the type of input device associated therewith. Since the computing device may already have information about the type and variation of the input device via the I/O interface, such information may be received by the display apparatus. Variation of the identified input device is further identified in a similar manner. Once the information about the type and variation of the input device is discerned, the location of the at least one actionable area of the input device is determined based on the information about the type and variation of the input device, as discussed in the preceding paragraphs.

Optionally, alternatively, the processor is configured to analyse the captured image to recognize one or more of depressions, extrusions and projections in the input device. Throughout the present disclosure, the term "depressions, extrusions and projections in the input device" refers to topographical features associated with the input device. The topographical features associated with the input device aids to determine the architecture of the input device, notably, the locations of the at least one actionable area of the input device. It may be contemplated by a person skilled in the art that the one or more of depressions, extrusions and projections in the input device are recognized by the processor using a suitable image processing algorithm (as discussed earlier). This helps processor with assessing and determining different locations of the at least one actionable area of the identified input device, and thereby the processor is able to determine a location of the at least one actionable area of the identified input device based on the recognized one or more of depressions, extrusions and projections.

Optionally, the processor is configured to:
obtain, from a computing device associated with the input device, information indicative of a user's input received by the input device; and
identify, based on the user's input, the at least one actionable area of the input device.

Throughout the present disclosure, the term "user's input" encompasses the kind of input received from the input device. Explicitly, the information indicative of a user's input is inclusive of: what type of input is being conveyed to the input device by the user, for example, motion, selection, sound or touch; how the input is being conveyed to the input device by the user which refers to the manner in which the input is provided to the input device, for example, an act of typing text on keyboard, act of clicking the buttons of mouse and the like; and when the input is conveyed to the input device by the user.

It may be contemplated that once the information about the user's input is discerned, the type and variation of the input device can be determined, and therefrom the location of the at least one actionable area of the input device is determined, as discussed in the preceding paragraphs.

The processor is configured to determine at least one functional element to be presented for the at least one actionable area, the at least one functional element being indicative of at least one of: a functionality of the at least one actionable area, a status of the at least one actionable area. Throughout the present disclosure, the term "at least one functional element" is a visual indication (may also be referred to as a virtual enhancement) of the functionality and/or the status of the at least one actionable area of the input device. The visual indication is virtually portrayed to the at least one actionable area of the input device in the extended-reality environment. The visual indication offers to add (virtually) non-existing informational elements to the input device (real or virtual). In an example, to propel an object in some extended-reality environment via keyboard keys "W", "A", "S" and "D" in the extended-reality environment, the visual indication on keys "W", "A", "S" and "D" can be provided by virtually indicating arrows to propel the object in forward, leftward, backward and rightward directions respectively. In another example, to shoot object (s) in some extended-reality environment via a left-button of mouse in the extended-reality environment, the visual indication on the left-button of mouse can be provided by virtually quoting a word "SHOOT" over it. In yet another example, to indicate the status of keys as "DISABLED" which are not serving any purpose in some extended-reality environment, the visual indication can be provided by virtually colouring such keys in red. In still another example, a status of the button that triggers something on and off with a button press can be shown indicating red text "OFF" when status being off and bright white text "ON" when being on.

Optionally, the processor is configured to:
obtain information about an application being executed at the display apparatus or a computing device associated with the input device;
determine a current operational mode of the input device based on the information about the application; and
determine the at least one functional element based on the current operational mode of the input device.

Throughout the present disclosure, the term "application" indicates the application, such as a software, including a game or the like, being executed in the extended-reality environment; for example, an extended-reality game, an extended-reality tutorial, an extended-reality movie, and the like. The application may be executed at the display apparatus itself, or on a computing device connected to the display apparatus and associated with the input device. Further, the term "operational mode" refers to mode of functioning of the input device wherein how the at least one actionable area of the input device responds pertaining to the application being executed at the display apparatus or a computing device associated with the input device. A current operational mode is based on the application being currently executed. The at least one functional element for the at least one actionable area of the input device are then customized in accordance with the current operational mode. Therefore, the at least one functional element indicates a functionality that is provided by the at least one actionable area in the current operational mode of the input device. In an example, for a keyboard, one operational mode could be a basic keyboard mode wherein the functionality of keyboard is to be used to type text, whilst another operational mode could be an extended-reality mode wherein the functionality of keyboard is to be used to move objects present in an extended-reality scene.

Optionally, the at least one functional element comprises at least one of: a symbol, a coloured indicator, a flashing indicator, a textual instruction, a graphical instruction. In an example, to move an object in forward direction in the extended-reality game via a keyboard key, the at least one functional element can comprise a symbol virtual indicating an arrow on that keyboard key. In another example, if a wrong keyboard key is pressed during the extended-reality game, the at least one functional element can comprise a red coloured indicator over that keyboard key indicating the wrong key has been pressed. In yet another example, for the extended-reality tutorial, the at least one functional element can comprise a textual instruction for a specific keyboard key performing a specific function. In still another example, a status of the button that triggers something on and off with a button press can be shown indicating red text "OFF" when status being off and bright white text "ON" when being on.

The processor is configured to process the captured image to generate an extended-reality image in which the at least one functional element is virtually superimposed over the at least one actionable area of the input device located in the first image segment or a virtual representation of the at least one actionable area of the input device. In this regard, the captured image is processed to generate an extended-reality image wherein the at least one functional element is virtually superimposed over the at least one actionable area of the input device located in the first image segment, in case of an augmented reality; or a virtual representation of the at least one actionable area of the input device, in case of a mixed reality. In an example of augmented reality in the extended-reality environment, the at least one functional element can be a yellow coloured indicator which is virtually superimposed over the at least one actionable area of the input device (in real-world environment) such as left button of mouse. In an example of mixed reality in the extended-reality environment, the at least one functional element can be a yellow coloured indicator which is virtually superimposed as the visual indication (which can be digitally generated) over the at least one actionable area of the virtual representation of the input device such as left button of mouse. It will be appreciated that the at least one functional element virtually superimposed to the at least one actionable area of the input device can be seen "snapped" to the at least one actionable area of the input device.

In one or more embodiments, the processor may consider the geometry of the at least one actionable area to generate the extended-reality image. For example, the input device in the form of a keyboard having keys may have certain relative distance for each key from the corners (or other recognizable features) of the keyboard. In such case, the generated extended-reality image may be transformed from an oblique projection to normal projection so as to be superimposed on the correct key position in the keyboard.

Optionally, the processor is configured to analyse the captured image to identify a second image segment representing a user's hand and to identify a hand gesture of the user's hand, and wherein, when processing the captured image to generate the extended-reality image, the processor is configured to:

replace the first image segment with a virtual input device that virtually represents the input device, the virtual input device comprising the virtual representation of the at least one actionable area of the input device; and replace the second image segment with a virtual hand that virtually represents the user's hand performing the identified hand gesture.

That is, to generate the mixed-reality image in the extended-reality environment both the input device (as represented by the first image segment) and the user's hand with its gesture (as represented by the second image segment) are virtualized. For this purpose, the first image segment and the second image segment are analysed and identified in the captured image of the extended-reality environment. Herein, the first image segment representing the input device (in the real-world environment) is replaced with a virtual input device (in the extended-reality environment) that virtually represents the input device. For example, if the first image segment represents keyboard as the input device, the same is replaced with a virtual keyboard in the mixed-reality image. Moreover, the virtual input device comprises the virtual representation of the at least one actionable area of the input device. For example, the virtual input device such as a keyboard comprises the virtual representation of numeric keys as the at least one actionable area of the keyboard. Further, herein, the second image segment representing the user's hand (one or both hands in the real-world environment) performing the identified hand gesture is replaced with a virtual hand (corresponding one or both hands in the extended-reality environment) that virtually represents the user's hand(s) performing the identified hand gesture. For example, the user's hand is replaced with a virtual hand that virtually represents the user's hand performing typing on a keyboard as the identified hand gesture.

It will be appreciated that transparency of the virtual input device (in the extended-reality environment) that virtually represents the input device and the virtual hand (one or both hands in the extended-reality environment) that virtually represents the user's hand performing the identified hand gesture, is adjusted maintained whilst the virtual hand is shown superimposed on the virtual input device, for the mixed reality image in the extended-reality environment. Thereby, in mixed reality environment, even user hand and gestures thereby are also virtually represented.

Optionally, the processor is configured to:
obtain, from the display apparatus, information indicative of a gaze direction of a user; and
identify a region of interest in the captured image based on the gaze direction of the user,
wherein, when analysing the captured image, the processor is configured to locate the first image segment in the region of interest in the captured image.

In this regard, the processor is configured to obtain the information indicative of the gaze direction of the user when the display apparatus, in operation, is worn by the user. The information indicative of the gaze direction of the user is obtained continuously while the display apparatus is in use. Herein, the term "information indicative of a gaze direction" refers to information that indicates a direction towards which the user is currently, or at a given moment, gazing. Notably, the information indicative of the gaze direction of the user is derived from eye-tracking data that is measured at the display apparatus.

In the display apparatus, the information indicative of the gaze direction of the user is obtained by means for detecting the gaze direction of the user. Herein, the term "means for detecting the gaze direction" refers to a specialized equipment for detecting and/or following a direction of gaze of the user of the display apparatus, when the user views a sequence of extended-reality images using the display apparatus. Notably, the gaze direction of the user is detected when the display apparatus, in operation, is worn by the user. Notably, at the display apparatus, the information indicative of the gaze direction of the user is optionally generated by a means for detecting the gaze direction of the user derived from the eye tracking data. The eye tracking data includes images of the user's eyes, motion sensor data, electrooculogram, and the like. Alternatively, the means for detecting the gaze direction is implemented by way of contact lenses with motion sensors, cameras monitoring the position of the pupil of the user's eye, and the like. Such means for detecting the gaze direction are well-known in the art. Beneficially, the means for detecting the gaze direction is arranged in a manner that said means does not cause any obstruction in an optical path of projections of the sequence of output images.

The gaze direction of the user helps processor to identify the region of interest in the captured image. Herein, the term "region of interest" refers to a region in the captured image of the real-world environment where the user's gaze is focused at a given point of time. Additionally, the gaze direction of the user is mapped to the captured image to identify the region of interest in the captured image. When the region of interest is established, the first image segment in the region of interest in the captured image is located. The region of interest in the captured image represents the first image segment representing the input device present in the real-world environment.

As discussed, the processor is configured to obtain, from the display apparatus, information indicative of a gaze direction of the user and identify the region of interest in the captured image based on the gaze direction of the user. This helps to identify the input device, on which the one or more functional elements are to be rendered, from one or more input devices present in the real-world environment. In some examples, the region of interest in the captured image is identified when the gaze direction of the user is mapped to the captured image. The region of interest in the captured image represents the first image segment representing the input device present in the real-world environment.

As discussed, there can be instances wherein a user using the HMD device with a given extended-reality environment has poor visibility of the input device through the HMD device and/or where the user faces difficulty in perceiving the actionable area of the input device through the HMD device. In another example, the use of multiple input devices for a given extended-reality environment, makes user's interactions quite complicated and difficult. In still another example, if a given input device is customizable in terms of application-specific controls, the user remains skeptical about the functionality of the actionable area of the input device for a type of extended-reality environment application. The imaging system of the present disclosure enables the user to provide correct input by representing the at least functional element over the actionable area of the input device. Beneficially, the input device reduces an effort on part of the user for interacting with the user device. The user is provided with a continuous, immersive, and realistic experience of the visual scene whilst interacting with the input device.

In an instance, the real-world environment can be, for example, an indoor environment wherein a user is working on a computer system. The computer system in the said indoor environment is attached to various peripheral devices including an input device, like a keyboard. The user is wearing the display apparatus, such as a head mounted display device. The image of indoor environment is captured by the at least one camera, in the imaging system of the display apparatus. The captured image is analysed by the processor of the imaging system to identify a first image segment representing the input device present in the real-world environment and to determine a location of at least one actionable area of the input device in the first image segment. The type and variation of the input device is identified either by comparing the captured image with the reference images accessed from a data repository, or obtaining information from the computing device associated with the input device. Herein, the imaging system identifies keyboard K from captured image. If a user presses a key X on keyboard K, the imaging system may identify position of key X from the captured image, and determine event "key X pressed" by image processing, or receive such event information from the computing system. The processor further determines at least one functional element to be presented for the at least one actionable area, for example based on the current application being executed by the display apparatus. Further, the processor generates an extended-reality image in which the at least one functional element is virtually superimposed over the at least one actionable area of the input device. For example, the imaging system may superimpose a colour on key X of keyboard K to highlight that the key X has been pressed.

The present disclosure also relates to the method as described above. Various embodiments and variants disclosed above, with respect to the aforementioned first aspect, apply mutatis mutandis to the method.

Optionally, in the method, the step of analysing the captured image comprises:
  accessing a data repository having stored therein reference images of different types of input devices and different variations of a given type of input device along with information pertaining to a plurality of reference features extracted from a given reference image;
  extracting a plurality of features from the captured image;
  comparing the plurality of features extracted from the captured image with the plurality of reference features extracted from the given reference image to identify a type and variation of the input device present in the real-world environment;
  accessing, from the data repository, information about the type and variation of the input device; and
  determining the location of the at least one actionable area of the input device based on the information about the type and variation of the input device.

Optionally, in the method, the step of analysing the captured image comprises:
  obtaining, from a computing device associated with the input device, information identifying a type and variation of the input device;
  accessing, from a data repository, information about the type and variation of the input device; and
  determining the location of the at least one actionable area in the input device based on the information about the type and variation of the input device.

Optionally, the method further comprises:

obtaining, from a computing device associated with the input device, information indicative of a user's input received by the input device; and identifying, based on the user's input, the at least one actionable area of the input device.

Optionally, the method further comprises analysing the captured image to identify a second image segment representing a user's hand and to identify a hand gesture of the user's hand, wherein the step of processing the captured image to generate the extended-reality image comprises:

replacing the first image segment with a virtual input device that virtually represents the input device, the virtual input device comprising the virtual representation of the at least one actionable area of the input device; and replacing the second image segment with a virtual hand that virtually represents the user's hand performing the identified hand gesture.

Optionally, the method further comprises:

obtaining information about an application being executed at the display apparatus or a computing device associated with the input device;

determining a current operational mode of the input device based on the information about the application; and determining the at least one functional element based on the current operational mode of the input device.

Optionally, the method further comprises:

obtaining, from the display apparatus, information indicative of a gaze direction of a user; and identifying a region of interest in the captured image based on the gaze direction of the user, wherein the step of analysing the captured image comprises locating the first image segment in the region of interest in the captured image.

Optionally, in the method, the at least one functional element comprises at least one of: a symbol, a coloured indicator, a flashing indicator, a textual instruction, a graphical instruction.

The present disclosure also relates to the display apparatus as described above. Various embodiments and variants disclosed above, with respect to the aforementioned aspects, apply mutatis mutandis to the display apparatus.

Optionally, a display apparatus comprising at least one image renderer, at least one camera and a processor configured to:

control the at least one camera to capture an image of a real-world environment;

analyse the captured image to identify a first image segment representing an input device present in the real-world environment and to determine a location of at least one actionable area of the input device in the first image segment;

determine at least one functional element to be presented for the at least one actionable area, the at least one functional element being indicative of at least one of: a functionality of the at least one actionable area, a status of the at least one actionable area;

process the captured image to generate an extended-reality image in which the at least one functional element is virtually superimposed over the at least one actionable area of the input device located in the first image segment or a virtual representation of the at least one actionable area of the input device; and render, via the at least one image renderer, the generated extended-reality image.

In this regard, the display apparatus comprises at least one image renderer, at least one camera and a processor. The processor is coupled to the at least one image renderer and the at least one camera.

Throughout the present disclosure, the term "image renderer" refers to equipment that, when operated, renders the extended-reality image. When the extended-reality image is rendered, a projection of the extended-reality image emanates from an image rendering surface of the at least one image renderer. Then, the projection of the extended-reality image is directed towards the user's eyes (via various components of the display apparatus) for showing the extended-reality image to the user.

Optionally, a given image renderer is implemented as a display. Optionally, the display is selected from the group consisting of: a Liquid Crystal Display (LCD), a Light Emitting Diode (LED)-based display, an Organic LED (OLED)-based display, a micro OLED-based display, and a Liquid Crystal on Silicon (LCoS)-based display.

Optionally, a given image renderer is implemented as a projector. In this regard, the extended-reality image is projected onto a projection screen or directly onto retinas of the user's eyes. Optionally, the projector is selected from the group consisting of: a Liquid Crystal Display (LCD)-based projector, a Light Emitting Diode (LED)-based projector, an Organic LED (OLED)-based projector, a Liquid Crystal on Silicon (LCoS)-based projector, a Digital Light Processing (DLP)-based projector, and a laser projector.

Optionally, in the display apparatus, the processor is configured to analyse the captured image to identify a second image segment representing a user's hand and to identify a hand gesture of the user's hand, and wherein, when processing the captured image to generate the extended-reality image, the processor is configured to:

replace the first image segment with a virtual input device that virtually represents the input device, the virtual input device comprising the virtual representation of the at least one actionable area of the input device; and replace the second image segment with a virtual hand that virtually represents the user's hand performing the identified hand gesture.

Optionally, in the display apparatus, the processor is configured to:

obtain information about an application being executed at the display apparatus or a computing device associated with the input device;

determine a current operational mode of the input device based on the information about the application; and determine the at least one functional element based on the current operational mode of the input device.

Optionally, the display apparatus further comprises means for detecting a gaze direction of a user, wherein the processor is configured to identify a region of interest in the captured image based on the gaze direction of the user, wherein, when analysing the captured image, the processor is configured to locate the first image segment in the region of interest in the captured image.

DETAILED DESCRIPTION OF THE DRAWINGS

Figure 1:
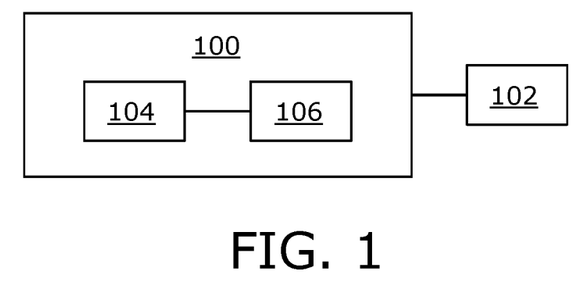
FIGS. 1, 2 and 3 illustrate block diagrams of architectures of an imaging system for producing extended-reality images for a display apparatus, in accordance with various embodiments of the present disclosure.

Referring to FIG. 1, illustrated is a block diagram of an architecture of an imaging system 100 for producing extended-reality images for a display apparatus 102, in accordance with an embodiment of the present disclosure. The imaging system 100 comprises at least one camera (depicted as a camera 104) and a processor 106 communicably coupled to the at least one camera 104. Herein, the processor 106 is configured to: control the at least one camera 104 to capture an image of a real-world environment; analyse the captured image to identify a first image segment representing an input device present in the real-world environment and to determine a location of at least one actionable area of the input device in the first image segment; determine at least one functional element to be presented for the at least one actionable area, the at least one functional element being indicative of at least one of: a functionality of the at least one actionable area, a status of the at least one actionable area; and process the captured image to generate an extended-reality image in which the at least one functional element is virtually superimposed over the at least one actionable area of the input device located in the first image segment or a virtual representation of the at least one actionable area of the input device.

Figure 2:
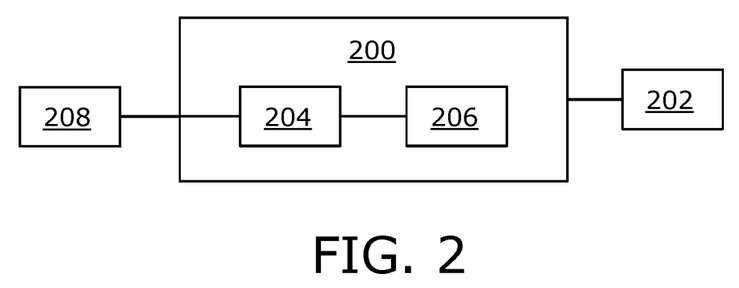

Referring to FIG. 2, illustrated is a block diagram of an architecture of an imaging system 200 for producing extended-reality images for a display apparatus 202, in accordance with another embodiment of the present disclosure. The imaging system 200 comprises at least one camera (depicted as a camera 204) and a processor 206 communicably coupled to the at least one camera 204. The processor 206 is also coupled with a data repository 208. In the imaging system 200, when analysing the captured image, the processor 206 is configured to: access the data repository 208 having stored therein reference images of different types of input devices and different variations of a given type of input device along with information pertaining to a plurality of reference features extracted from a given reference image; extract a plurality of features from the captured image; compare the plurality of features extracted from the captured image with the plurality of reference features extracted from the given reference image to identify a type and variation of the input device present in the real-world environment; access, from the data repository 208, information about the type and variation of the input device; and determine the location of the at least one actionable area of the input device based on the information about the type and variation of the input device.

Figure 3:
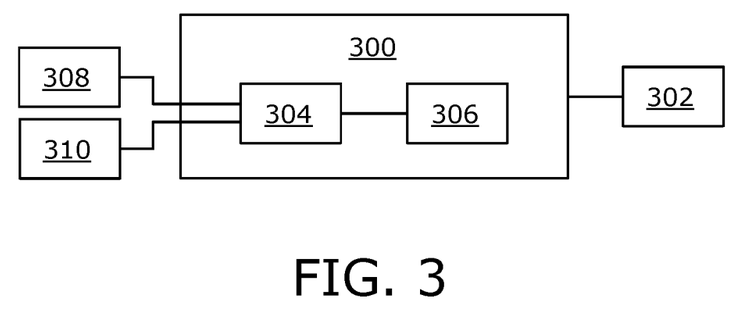

Referring to FIG. 3, illustrated is a block diagram of an architecture of an imaging system 300 for producing extended-reality images for a display apparatus 302, in accordance with yet another embodiment of the present disclosure. The imaging system 300 comprises at least one camera (depicted as a camera 304) and a processor 304 communicably coupled to the at least one camera 304. The processor 304 is coupled with a data repository 308 and with a computing device 310. In the imaging system 300, when analysing the captured image, the processor 306 is configured to obtain, from a computing device 310 associated with the input device, information identifying a type and variation of the input device; access, from a data repository 308, information about the type and variation of the input device; and determine the location of the at least one actionable area in the input device based on the information about the type and variation of the input device.

Figure 4:
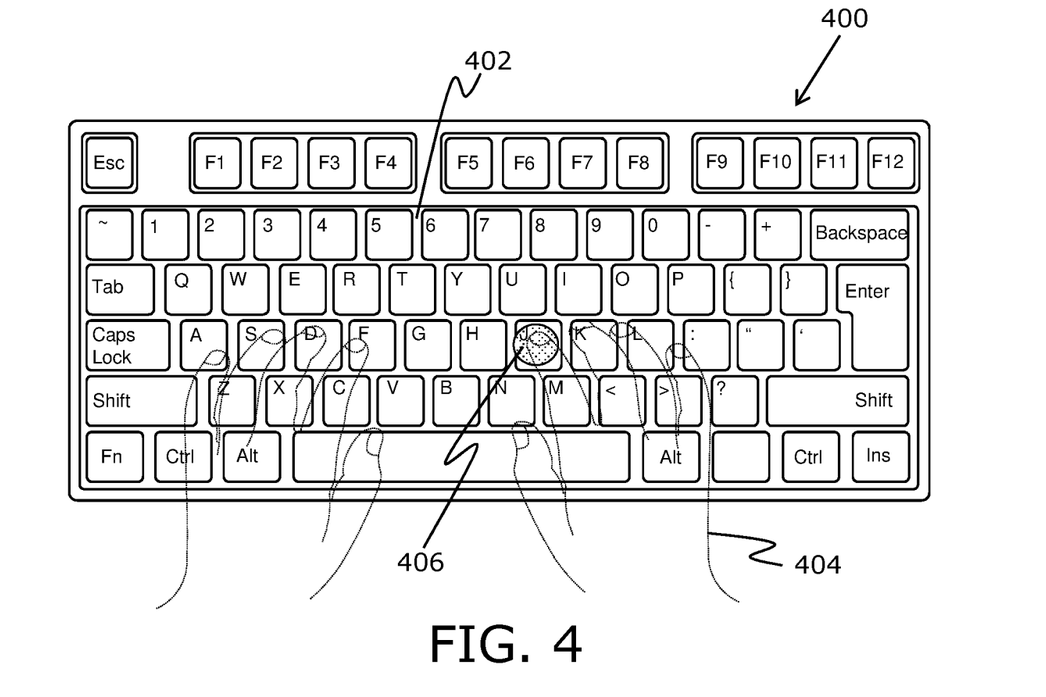
FIG. 4 illustrates a schematic illustration of an exemplary input device presented in an extended-reality environment, in accordance with an embodiment of the present disclosure.

Referring to FIG. 4, illustrated is a schematic illustration of an exemplary input device 400, in accordance with an embodiment of the present disclosure. The exemplary input device 400 is a keyboard including alphabet keys, numeric keys and control keys which serves individual functionality. At least one key of the aforesaid keys of the keyboard represents at least one actionable area 402 of the exemplary input device 400. A user's hand(s) 404 provides an input by pressing the at least one actionable area 402 of the exemplary input device 400. When the said user's hand(s) 404 provides the input by pressing the at least one actionable area 402 of the exemplary input device 400, a visual indication, as at least one functional element 406, corresponding to the at least one actionable area 402 being pressed is virtually represented over the at least one actionable area 402 of the exemplary input device 400. The at least one functional element 406 comprises at least one of: a symbol, a coloured indicator, a flashing indicator, a textual instruction, a graphical instruction. a symbol, a coloured indicator, a flashing indicator, a textual instruction, a graphical instruction. In FIG. 4, a circular dotted hatched indicator over an alphabet key "J" virtually represents the functional element 406 (visual indication) on the at least one actionable area 402 (in this case, the alphabet key "J") of the exemplary input device 400 that is being pressed by the user's hand(s) 404. Notably, the at least one functional element 406 is virtually superimposed over the at least one actionable area 402 of the input device.

Figure 5:
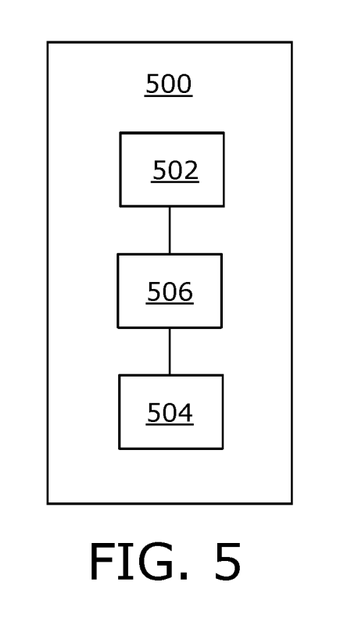
FIGS. 5 and 6 illustrate block diagrams of architectures of a display apparatus, in accordance with various embodiments of the present disclosure.

Referring to FIG. 5, illustrated is a block diagram of an architecture of a display apparatus 500, in accordance with an embodiment of the present disclosure. The display apparatus 500 comprises at least one image renderer 502, at least one camera 504 and a processor 506. The processor 506 being coupled to the at least one image renderer 502 and the at least one camera 504. The processor 506 is configured to: control the at least one camera 504 to capture an image of a real-world environment; analyse the captured image to identify a first image segment representing an input device present in the real-world environment and to determine a location of at least one actionable area of the input device in the first image segment; determine at least one functional element to be presented for the at least one actionable area, the at least one functional element being indicative of at least one of: a functionality of the at least one actionable area, a status of the at least one actionable area; process the captured image to generate an extended-reality image in which the at least one functional element is virtually superimposed over the at least one actionable area of the input device located in the first image segment or a virtual representation of the at least one actionable area of the input device; and render, via the at least one image renderer 502, the generated extended-reality image.

Figure 6:
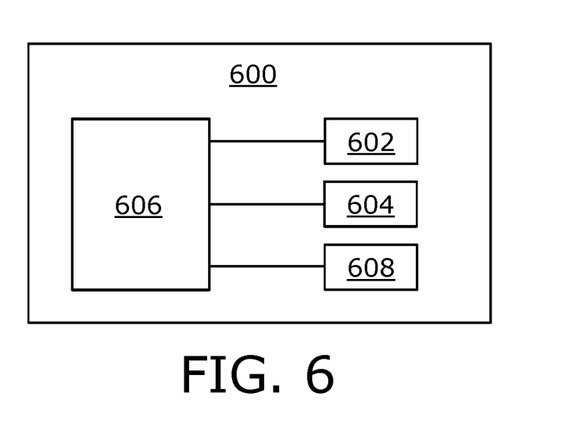

Referring to FIG. 6, illustrated is a block diagram of an architecture of a display apparatus 600, in accordance with another embodiment of the present disclosure. The display apparatus 600 comprises at least one image renderer 602, at least one camera 604 and a processor 606. The processor 606 is coupled to the at least one image renderer 602 and the at least one camera 604. The display apparatus 600 also comprises means 608 for detecting a gaze direction of the user. The processor 606 is configured to identify a region of interest in the captured image based on the gaze direction of the user, wherein, when analysing the captured image, the processor is configured to locate the first image segment in the region of interest in the captured image.

Figure 7:
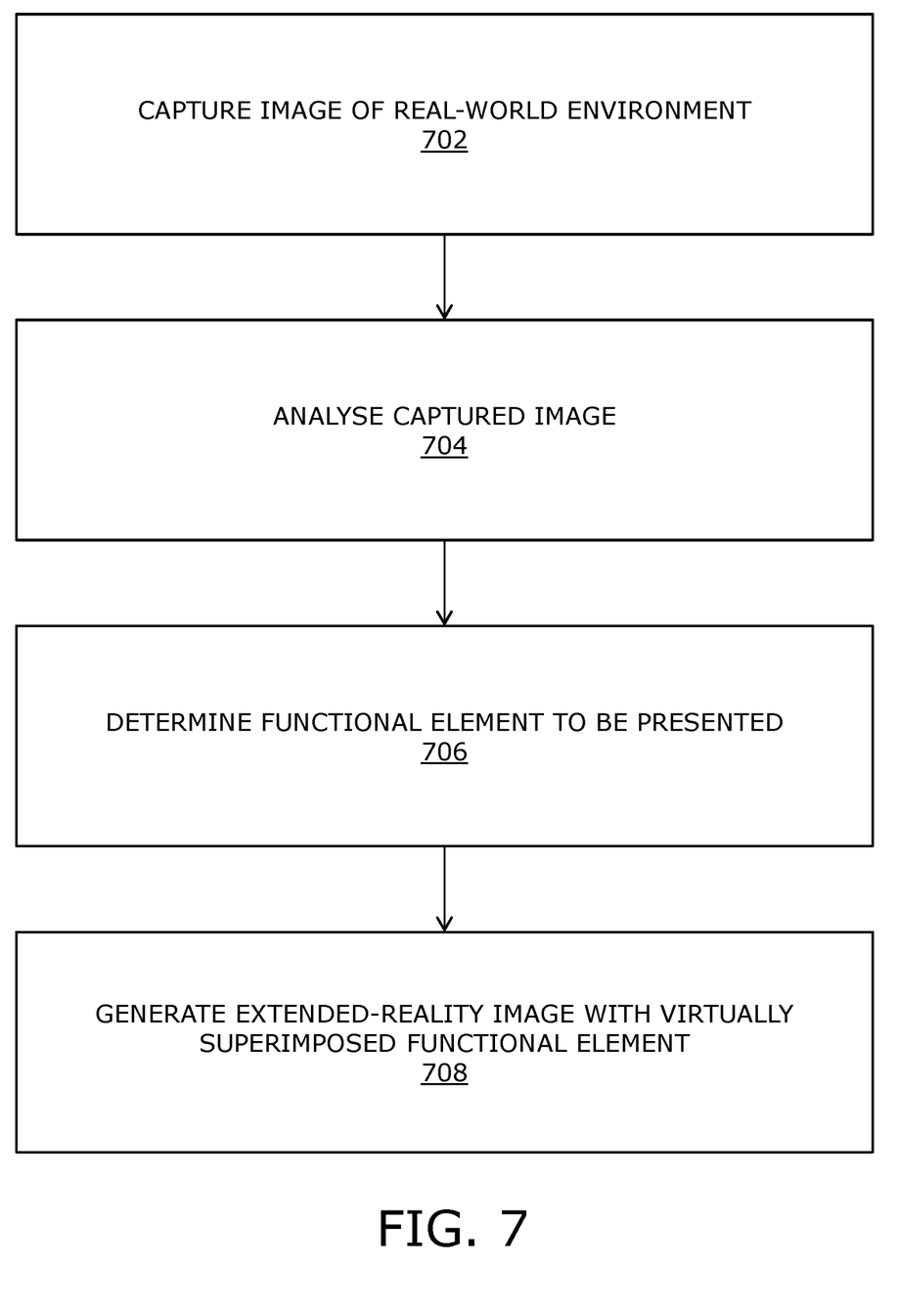
FIG. 7 illustrates steps of a method for producing extended-reality images for a display apparatus, in accordance with an embodiment of the present disclosure.

Referring to FIG. 7, illustrated are steps of a method for producing extended-reality images for a display apparatus, in accordance with an embodiment of the present disclosure. Herein, the imaging system comprises at least one camera and a processor communicably coupled to the at least one camera. At step 702, the at least one camera of the imaging system captures an image of a real-world environment. At step 704, the captured image is analysed, by the processor, to identify a first image segment representing an input device present in the real-world environment and to determine a location of at least one actionable area of the input device in the first image segment. At step 706, at least one functional element to be presented is determined, by the processor, for the at least one actionable area. Herein, the at least one functional element is indicative of at least one of: a functionality of the at least one actionable area and/or a status of the at least one actionable area. At step 708, the captured image is processed to generate an extended-reality image in which the at least one functional element is virtually superimposed over the at least one actionable area of the input device located in the first image segment or a virtual representation of the at least one actionable area of the input device.

The steps 702 to 708 are only illustrative and other alternatives can also be provided where one or more steps are added, one or more steps are removed, or one or more steps are provided in a different sequence without departing from the scope of the claims herein.

What is claimed is:

1. An imaging system for producing extended-reality images for a display apparatus, the imaging system comprising at least one camera and a processor communicably coupled to the at least one camera, wherein the processor is configured to:
   control the at least one camera to capture an image of a real-world environment;
   analyse the captured image to identify a first image segment representing an input device present in the real-world environment and to determine a location of at least one actionable area of the input device in the first image segment;
   determine at least one functional element to be presented for the at least one actionable area, the at least one functional element being indicative of at least one of: a functionality of the at least one actionable area, a status of the at least one actionable area; and
   process the captured image to generate an extended-reality image in which the at least one functional element is virtually superimposed over the at least one actionable area of the input device located in the first image segment or a virtual representation of the at least one actionable area of the input device;
   wherein, when analysing the captured image, the processor is configured to:
      access a data repository having stored therein reference images of different types of input devices and different variations of a given type of input device along with information pertaining to a plurality of reference features extracted from a given reference image;
      extract a plurality of features from the captured image;
      compare the plurality of features extracted from the captured image with the plurality of reference features extracted from the given reference image to identify a type and variation of the input device present in the real-world environment;
      access, from the data repository, information about the type and variation of the input device; and
      determine the location of the at least one actionable area of the input device based on the information about the type and variation of the input device.

2. The imaging system of claim 1, wherein, when analysing the captured image, the processor is configured to:
   obtain, from a computing device associated with the input device, information identifying a type and variation of the input device;
   access, from a data repository, information about the type and variation of the input device; and
   determine the location of the at least one actionable area in the input device based on the information about the type and variation of the input device.

3. The imaging system of claim 1, wherein the processor is configured to:
   obtain, from a computing device associated with the input device, information indicative of a user's input received by the input device; and
   identify, based on the user's input, the at least one actionable area of the input device.

4. The imaging system of claim 1, wherein the processor is configured to analyse the captured image to identify a second image segment representing a user's hand and to identify a hand gesture of the user's hand, and wherein, when processing the captured image to generate the extended-reality image, the processor is configured to:
   replace the first image segment with a virtual input device that virtually represents the input device, the virtual input device comprising the virtual representation of the at least one actionable area of the input device; and
   replace the second image segment with a virtual hand that virtually represents the user's hand performing the identified hand gesture.

5. The imaging system of claim 1, wherein the processor is configured to:
   obtain information about an application being executed at the display apparatus or a computing device associated with the input device;
   determine a current operational mode of the input device based on the information about the application; and
   determine the at least one functional element based on the current operational mode of the input device.

6. The imaging system of claim 1, wherein the processor is configured to:
   obtain, from the display apparatus, information indicative of a gaze direction of a user; and
   identify a region of interest in the captured image based on the gaze direction of the user,
   wherein, when analysing the captured image, the processor is configured to locate the first image segment in the region of interest in the captured image.

7. The imaging system of claim 1, wherein the at least one functional element comprises at least one of: a symbol, a coloured indicator, a flashing indicator, a textual instruction, a graphical instruction.

8. A method for producing extended-reality images for a display apparatus, the method comprising:
   capturing an image of a real-world environment;
   analysing the captured image to identify a first image segment representing an input device present in the real-world environment and to determine a location at least one actionable area of the input device in the first image segment;
   determining at least one functional element to be presented for the at least one actionable area, the at least one functional element being indicative of at least one of: a functionality of the at least one actionable area, a status of the at least one actionable area; and
   processing the captured image to generate an extended-reality image in which the at least one functional element is virtually superimposed over the at least one actionable area of the input device located in the first image segment or a virtual representation of the at least one actionable area of the input device;
   wherein the step of analysing the captured image comprises:

accessing a data repository having stored therein reference images of different types of input devices and different variations of a given type of input device along with information pertaining to a plurality of reference features extracted from a given reference image;

extracting a plurality of features from the captured image;

comparing the plurality of features extracted from the captured image with the plurality of reference features extracted from the given reference image to identify a type and variation of the input device present in the real-world environment;

accessing, from the data repository, information about the type and variation of the input device; and determining the location of the at least one actionable area of the input device based on the information about the type and variation of the input device.

9. The method of claim 8, wherein the step of analysing the captured image comprises:

obtaining, from a computing device associated with the input device, information identifying a type and variation of the input device;

accessing, from a data repository, information about the type and variation of the input device; and determining the location of the at least one actionable area in the input device based on the information about the type and variation of the input device.

10. The method of claim 8, wherein the method further comprises:

obtaining, from a computing device associated with the input device, information indicative of a user's input received by the input device; and identifying, based on the user's input, the at least one actionable area of the input device.

11. The method claim 8, wherein the method further comprises analysing the captured image to identify a second image segment representing a user's hand and to identify a hand gesture of the user's hand, wherein the step of processing the captured image to generate the extended-reality image comprises:

replacing the first image segment with a virtual input device that virtually represents the input device, the virtual input device comprising the virtual representation of the at least one actionable area of the input device; and replacing the second image segment with a virtual hand that virtually represents the user's hand performing the identified hand gesture.

12. The method of claim 8, wherein the method further comprises:

obtaining information about an application being executed at the display apparatus or a computing device associated with the input device;

determining a current operational mode of the input device based on the information about the application; and determining the at least one functional element based on the current operational mode of the input device.

13. The method of claim 8, wherein the method further comprises:

obtaining, from the display apparatus, information indicative of a gaze direction of a user; and identifying a region of interest in the captured image based on the gaze direction of the user, wherein the step of analysing the captured image comprises locating the first image segment in the region of interest in the captured image.

14. The method of claim 8, wherein the at least one functional element comprises at least one of: a symbol, a coloured indicator, a flashing indicator, a textual instruction, a graphical instruction.

15. A display apparatus comprising at least one image renderer, at least one camera and a processor configured to:

control the at least one camera to capture an image of a real-world environment;

analyse the captured image to identify a first image segment representing an input device present in the real-world environment and to determine a location of at least one actionable area of the input device in the first image segment;

determine at least one functional element to be presented for the at least one actionable area, the at least one functional element being indicative of at least one of: a functionality of the at least one actionable area, a status of the at least one actionable area;

process the captured image to generate an extended-reality image in which the at least one functional element is virtually superimposed over the at least one actionable area of the input device located in the first image segment or a virtual representation of the at least one actionable area of the input device; and render, via the at least one image renderer, the generated extended-reality image;

wherein, when analysing the captured image, the processor is configured to:

access a data repository having stored therein reference images of different types of input devices and different variations of a given type of input device along with information pertaining to a plurality of reference features extracted from a given reference image;

extract a plurality of features from the captured image;

compare the plurality of features extracted from the captured image with the plurality of reference features extracted from the given reference image to identify a type and variation of the input device present in the real-world environment;

access, from the data repository, information about the type and variation of the input device; and determine the location of the at least one actionable area of the input device based on the information about the type and variation of the input device.

16. The display apparatus of claim 15, wherein the processor is configured to analyse the captured image to identify a second image segment representing a user's hand and to identify a hand gesture of the user's hand, and wherein, when processing the captured image to generate the extended-reality image, the processor is configured to:

replace the first image segment with a virtual input device that virtually represents the input device, the virtual input device comprising the virtual representation of the at least one actionable area of the input device; and replace the second image segment with a virtual hand that virtually represents the user's hand performing the identified hand gesture.

17. The display apparatus of claim 15, wherein the processor is configured to:

obtain information about an application being executed at the display apparatus or a computing device associated with the input device;

determine a current operational mode of the input device based on the information about the application; and
determine the at least one functional element based on the current operational mode of the input device.

18. The display apparatus of claim 15, further comprising means for detecting a gaze direction of a user, wherein the processor is configured to identify a region of interest in the captured image based on the gaze direction of the user,
wherein, when analysing the captured image, the processor is configured to locate the first image segment in the region of interest in the captured image.

* * * * *